Figure 1:
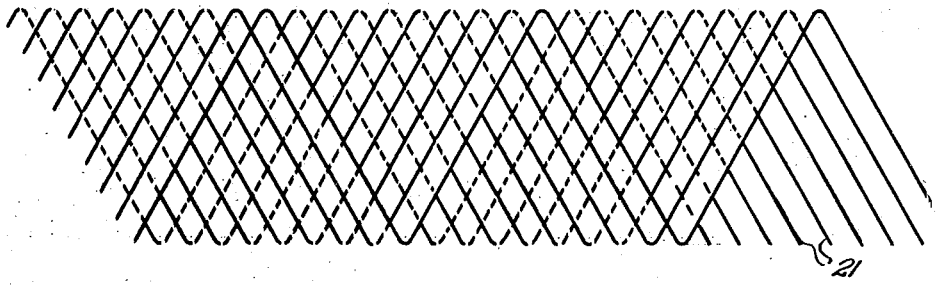

Aug. 2, 1938.  W. E. REED  2,125,583
WIRE FABRIC
Filed Aug. 3, 1934  4 Sheets-Sheet 1

INVENTOR
William Edgar Reed,
By Archworth Martin,
Attorney.

Aug. 2, 1938. W. E. REED 2,125,583
WIRE FABRIC
Filed Aug. 3, 1934 4 Sheets-Sheet 2

INVENTOR
William Edgar Reed,
By Archworth Martin,
Attorney.

Aug. 2, 1938.  W. E. REED  2,125,583
WIRE FABRIC
Filed Aug. 3, 1934   4 Sheets-Sheet 3
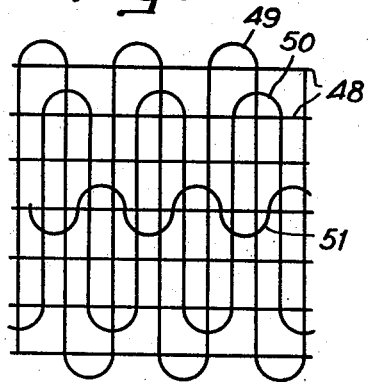
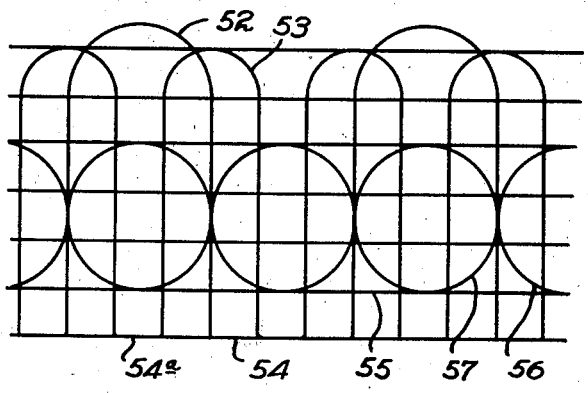
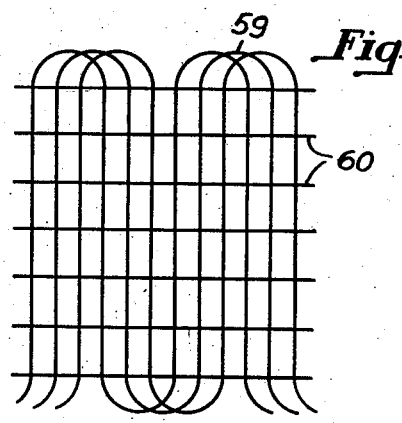
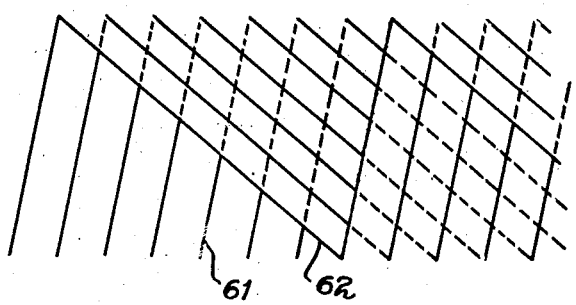
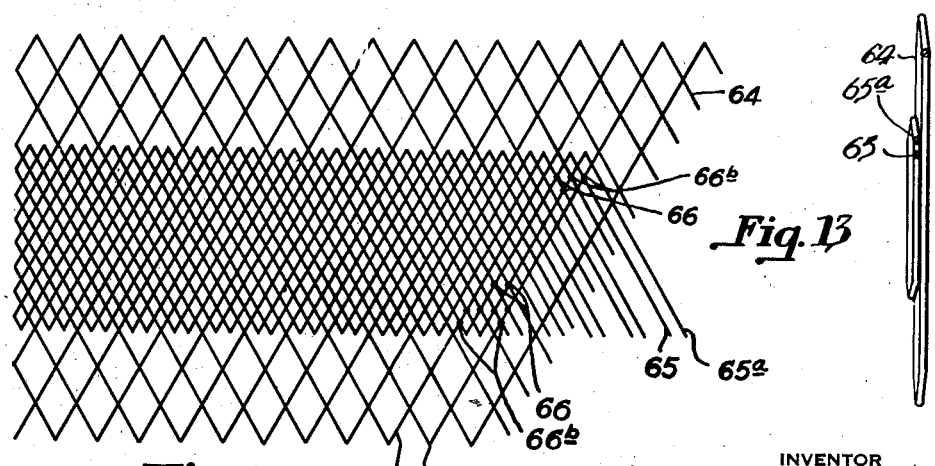
INVENTOR
William Edgar Reed,
By Archworth Martin,
Attorney.

Aug. 2, 1938.   W. E. REED   2,125,583
WIRE FABRIC
Filed Aug. 3, 1934   4 Sheets-Sheet 4
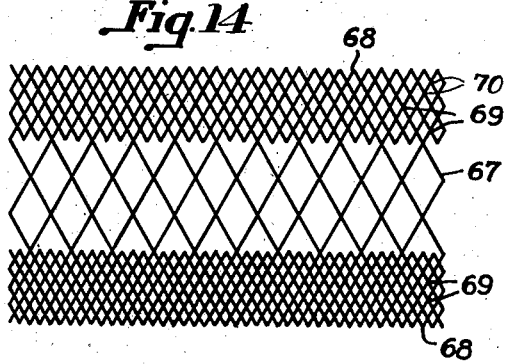
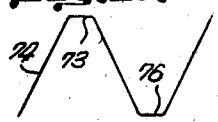
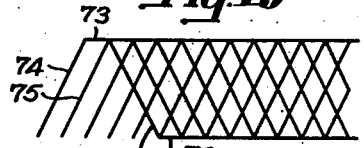
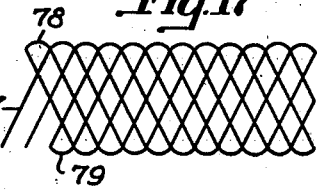
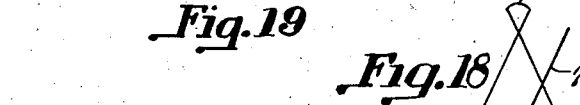
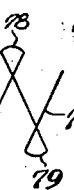
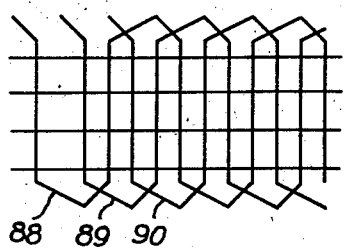
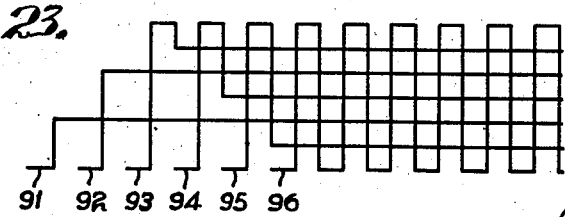
INVENTOR
William Edgar Reed,
By Archworth Martin,
Attorney.

Patented Aug. 2, 1938

2,125,583

UNITED STATES PATENT OFFICE 2,125,583

WIRE FABRIC

William Edgar Reed, Pittsburgh, Pa.

Application August 3, 1934, Serial No. 738,277

23 Claims. (Cl. 189—82)

My invention relates to improvements in fabrics including wire fabrics, such as are employed for fencing, reinforcement, screens, cloth and other mesh-like structures, and constitutes a continuation in part of my application, Serial No. 665,710, filed April 12, 1933, now Patent 2,000,788, which is a continuation in part of my application, Serial No. 393,692, filed September 19, 1929, (now Patent No. 1,908,050).

One object of my invention is to provide a fabric that possesses various new advantages in the way of form, structural characteristics, flexibility, elasticity and strength as compared to fabrics of the prior art.

Another object of my invention is to provide an improved fabric which may be composed entirely of continuous strands.

Another object of my invention is to provide a mesh formed of continuously extending strands or sets of strands, with the strands of one set positioned in such relation to the strands of the other sets that the fabric thus produced will have desired differences in mesh spacing, structural characteristics and rigidity, as between various portions thereof.

Still another object of my invention is to provide a wire fabric of the welded type, by the employment of continuously-extending wires, without the necessity of cutting, fitting, straightening, holding and welding separate short lengths of material, with consequent saving of expense and facilitating more rapid and better manufacture thereof, and in a continuous operation.

Still another object of my invention is to provide a fabric made of diagonally extending continuous strands that intersect or interlace, or of strands that extend in various forms and directions and intersect or interconnect, and are attached together at part or all of their crossings, or are laid upon, into or between other materials, or upon which other material is laid of which they may form a part thereof or reinforcement or surfacing therefor, and which materials may retain the strands in position without their crossings being united, or of arranging strands so that some strands hold others in position.

Still another object of my invention is to make a mesh fabric with strands or sets of strands extending at multiple angles with respect to each other and with respect to the length of fabric, so as to secure flexibility and rigidity in various desired directions, as well as in the usual right angle directions of fabrics made with longitudinal strands and stays crossing them at right angles. And, also, to make rigidity in one direction more or less than in the other directions or to make certain areas stronger than other areas, or of different formation and structure.

Still another object of my invention is to form different patterns, for decorative effect or usefulness.

Still another object is to make fabric of different multiple thicknesses or plies throughout, or only in certain surface areas.

Still another object is to provide the equivalent of woven fabrics and textiles having various mesh forms and interconnections, and of diagonal, rectangular or other mesh.

Still another object is to provide duplex or multiplex fabrics which are interlaced or intermeshed.

Still another object is to provide intermeshed multiple fabrics that may be displaced relative to each other either in the plane of such fabrics or in different planes.

Another object is to provide a fabric that is made without twisting of the strands, and in which there are no inherent torsional strains caused by its method of formation.

Various forms of fabric embodying my invention are shown in the accompanying drawings wherein—

Figure 2:
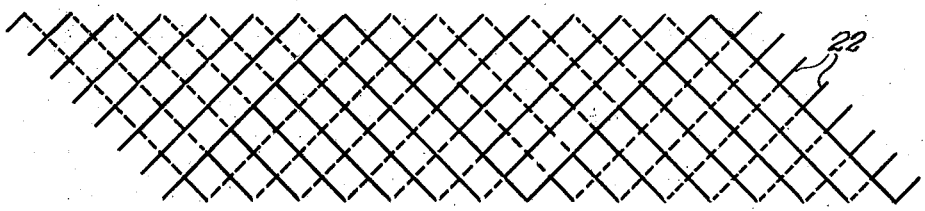
Figure 3:
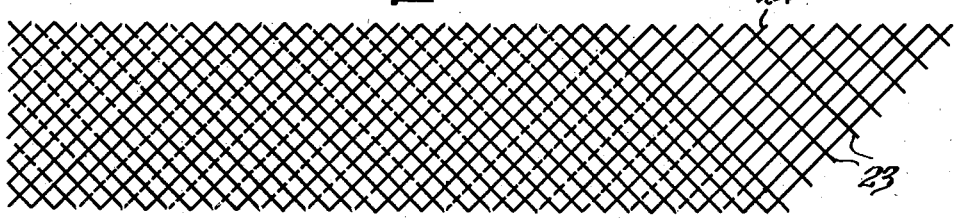
Figure 4:
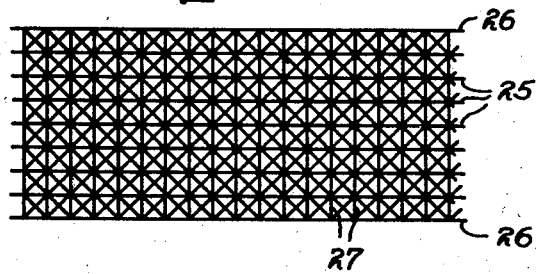
Figure 5:
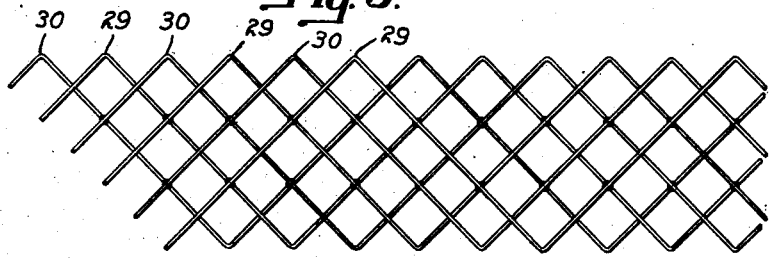

Figure 1 is a face view of a diamond mesh fabric formed of continuous strands; Fig. 2 is a face view showing a slightly different pattern; Fig. 3 shows a pattern similar to that of Fig. 2, but employing two sets of continuous strands instead of a single set as in Figs. 1 and 2; Fig. 4 is a modification showing transverse and longitudinally-extending continuous straight strands in conjunction with the diagonally-arranged strands; Fig. 5 shows wire fabric similar to that of Fig. 2 with certain of the welds omitted to permit relative displacement of the two separate welded mesh mats as in Fig. 6; Fig. 7 shows a structure wherein two transverse strands are employed, each laid on diagonal lines, with the said strands offset relative to one another in directions longitudinally of the mesh.

Fig. 8 shows a combination of longitudinally-extending straight strands and bent strands, some of which extend only partially the width of the fabric; Fig. 9 is a modification of the structure of Fig. 8; Fig. 10 shows a modification which is somewhat similar to Fig. 8, but shows multiple transverse strands.

Fig. 11 is a modification of the structure shown in Figs. 1 and 2, with the strands laid at a greater angle in one direction than in the other direction; Fig. 12 shows a composite mesh structure consisting of two bodies of mesh of a form similar to that shown in Figs. 1 and 2, but with one group of strands forming a band of narrow width; Fig. 13 shows an end view of the structure of Fig. 12; Fig. 14 shows a modification of the structure of Fig. 12 with the narrow bands at the edges of the wide band instead of at the middle thereof; Fig. 15 shows another modification of the structure of Fig. 1, wherein the strands are so laid and bent that a continuous straight layer edge effect is produced instead of the serrated edge of Fig. 1; Fig. 16 shows the shape to which each strand of Fig. 15 is bent; Fig. 17 shows a mesh having the strands so bent as to cross and recross themselves, as shown in Fig. 18; Fig. 19 shows a fabric having each strand laid on diagonal lines that intersect one another at points intermediate the longitudinal edges of the fabric.

Figure 20 shows a structure wherein the strands are laid mainly on diagonal lines, but have portions thereof disposed on lines which are at right angles to the longitudinal axis of the fabric; Fig. 21 shows a structure wherein the strands are disposed mainly on lines which extend at right angles to the longitudinal axis of the mesh, with the strands relatively displaced in directions longitudinally of the mesh; Fig. 22 shows the strands laid in stepped bends and assembled to form rectangular mesh openings, and Fig. 23 shows the manner in which the wires of Fig. 22 are bent.

The various forms of fabric are preferably formed of wire strands which are welded together at points of intersection to retain them in unitary relation, but it will be understood that:

1. The strands may be of various cross-sectional shapes and areas and differ in the same fabric.
2. The strands may be of other materials than wire, or part be of wire and part of other materials.
3. All or any desired intersections may be welded or strands otherwise retained in relative position.
4. The strands may be fastened together or held in relative position by other than welding means.
5. The strands may be laid on or between other materials or the materials laid on the strands and retained in position. For example, they may be laid on or between sheets of material such as rubber, paper, metals, fiber, etc.
6. Material may be placed between the layers of strands or between only certain strands or supplemental strands, of the weaves and patterns formed.
7. The strands, between edges of fabric, may be laid straight or curved and reversed curved or combinations thereof, and in any directions and with constant or varying amplitudes, the mesh openings may be square, diamond, rhomboidal, triangular or have sinusoidal, curved or various other shaped sides.
8. Strands may be separated by other than uniform distances which may be varying distances and may intersect.
9. End bends may be of different shapes, and may be different at opposite edges of fabric, or even along the same edge.

Suitable apparatus for forming the fabric is shown and described in my application above-referred to and in the parent patent of said application, No. 1,908,050, issued May 19, 1933.

Referring to Fig. 1, the fabric is shown as composed of one set of nine strands 21 which are bent in alternately opposite directions along diagonal lines, each diagonally-extending layer overlying approximately one-half of the preceding layer to form a two-layer fabric, the strands being welded together where they cross, the full and broken lines indicating the upper and lower layers respectively.

These diagonal strands are shown as laid at approximately 60° and the mesh is diamond shape. An odd number of strands are employed, and the opposite bends are not in line but are intermediate between two adjacent bends on the opposite side. The pitch is approximately 15% greater than the fabric width, but this may be changed as desired, by changing the diagonal feed angle, shape of edge bends, and the longitudinal distance taken in their formation or the longitudinal distance required to complete one cycle of a two-layer fabric.

It will be understood that the edge bend of the strands may take various other shapes than that shown such as angular, circular, rectangular, straight or curved, or reverse curved—and the radius of curvature may vary—being half or several times the strand spacing—or the longitudinal distance taken in making the bend may be greater than the strand spacing, thus varying the number of strands employed in the series, and the width of the strand series and its relation to the width of the fabric—the long bend requiring more strands and the reverse bend less strands in the series—than the single angular bend.

In Fig. 2, I show a fabric formed substantially as in Fig. 1, by folding the strands upon themselves, but wherein the diagonal angle is different, being approximately 45°. An even number of strands (eight) are employed, and the opposite bends are in line at right angle to the length—the pitch is approximately twice the fabric width, the bends are angular, and the fabric is a two-layer fabric. The mesh openings are rectangular.

Each successive layer or fold of the strands 21 and 22 of Figs. 1 and 2 overlies substantially one-half of the preceding layer or fold, when fed in one series of pitch width—with single angular bends when forming a two-layer fabric.

In Fig. 3, I show a mesh composed of two groups of strands 23 and 24 each of which is lead substantially as are the strands 22 of Fig. 2. One group of strands being superposed upon the other group but in offset relation thereto in a direction longitudinal of the fabric, thus forming a fabric having mesh openings substantially one-half the size of the openings of Fig. 2, or of either mesh formed by wires 23 or 24 alone. The individual strands 23 are laid between adjacent strands 24. In this as in Figs. 1 and 2, the strands may be attached or welded together at all crossings or at different points to maintain them in assembled relation.

If desired, the strands 24 may first be welded at their crossings before the second set 23 are laid and welded, or the welding may be done after both groups are laid. Strands 23 may or may not be equally spaced from two adjacent strands 24.

The fabrics as shown in Figs. 1, 2 and 3 are composed of continuously-extending bent strands, and the fabrics are of such flexibility and elasticity as to permit convenient stretching and installation thereof, since they will yield in longitudinal and transverse directions. Also, the fabric possesses greater elasticity than the various types of woven or twisted fabrics, without the objectionable distortion and looseness frequently present in such fabrics, and at a considerable saving in the amount of material required for and cost of manufacture over twisted or woven fabric structures, and less zinc for the galvanization thereof. The direction of rigidity is generally along the length of strands and the flexibility at angles thereto.

Referring to Fig. 4, I show a mesh composed of diagonally-arranged strands as in either Figs. 1, 2, or 3, together with longitudinal straight wires 25 and 26, the transverse, straight stay wires 27 being welded to the continuous diagonally-laid wires and the wires 25 welded to the wires 27, or to the diagonal wires. This structure of strands extending in multiple directions will, of course, be much stiffer than the structures of Figs. 1, 2 and 3, since the straight wires will resist stretching of the fabric in longitudinal and lateral directions also, or have four directions of rigidity. The wires 26 may constitute selvage members and be of heavier material than the intermediate wires 25.

By omitting wires 25 and 26, the fabric can be more easily stretched in a longitudinal direction, while if the wires 27 are omitted, the wires 25 and 26 will resist longitudinal stretching of the fabric, but it can be more readily flexed in lateral directions. In other words, the lateral and longitudinal elasticity of the fabric will depend largely upon the presence or absence of the straight strands 25, 26 and 27. Further, any amount of desired flexibility may be given these various wires by changing their shape from that of straight wires to various curved, spiraled or irregular form, or by omitting part of the welds.

Figure 6:
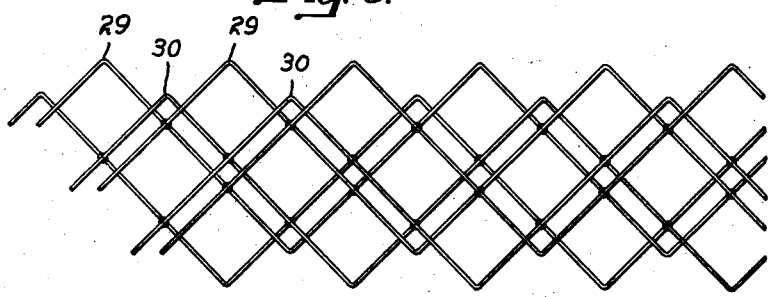
Figure 7:
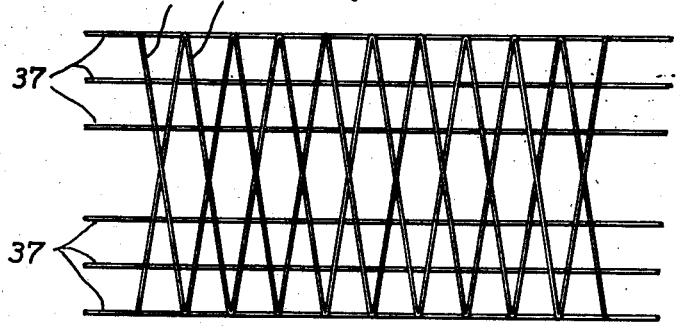

Referring to Figs. 5 and 6, I show a duplex structure composed of two sets of strands 29 and 30, respectively, the strands 29 being welded to one another and the strands 30 welded together. By this arrangement two smaller strands may be employed instead of each large strand, and two interwoven or interlaced fabrics are thereby formed that may be displaced relatively to each other in various directions—thus forming a double mesh structure of greater spacing and mesh openings and composed practically of two parallel strands, which strands are more easily handled than a single heavy strand of twice the strength.

It will be noted from Fig. 5 that the equivalent of a woven structure can be produced and in a much simpler, quicker and cheaper way than by weaving. Certain welds in other structures or types shown may similarly be omitted thus forming various double, triple or multiple weaves or combinations of weaves and mesh, such as rectangular, diagonal, triangular, rhomboidal, and those with curved sides, and some structures are self-supporting with all welds omitted.

Fig. 7 shows a structure that includes two continuous stay wires 35 and 36 which cross each other, and are placed against the strands 37 and welded thereto. All or any part of the crossings may be welded.

Fig. 8 shows an example of structures of various shaped strands comprising straight strand wires 48, and superposed continuous bent wires 49 and 50, which extend mainly at right angles to the wires 48 and are welded against the same. The continuous cross wire 49 lies against the wires 48, as does also the continuous cross wire 50, the latter wire, however, does not extend the full width of the fabric. A third bent wire 51 is employed, and may be welded either to the wires 49 and 50, or to the wires 48, or to all of such wires. The wires 49 are welded to the straight wires 48 and the wires 50 are welded to the wires 48 and 49 which abut either of said wires.

Fig. 9 shows an example of a structure composed of transverse strands of different pitches, shapes, widths and end bends, and with straight longitudinal strands 55. The continuous bent strands 52, 53 and 56 are laid similarly to the wires 49, in superposed relation, but have different shapes and pitches and cover different parts of the fabric width. The end bends are also different. Strand 52 has a curved bend at one edge of the fabric and longitudinal runs 54 covering several spacings at the oposite edge of the fabric, which is less flexible and acts as a selvage edge. The strand 53 has similar straight selvage portions 54a.

This structure includes two continuous bent strands 56 and 57 each of which may correspond somewhat to the wire 51 but which cross one another and are suitably attached or welded in place, either to other wires or to one another, producing circular figures of useful and ornamental effect.

Fig. 10 is somewhat similar to Fig. 8, but shows a series of continuous strands 59 instead of a single strand, the strands 59 overlapping one another at points adjacent to their bends and being welded to the straight strand wires 60. The wires 59 can also be welded together where they cross one another. The spacing of strands 59 may be such as to give symmetrically-spaced end bends as shown in Fig. 21.

In Fig. 11 is shown a structure which corresponds somewhat to the structures of Fig. 1, in that it consists of a set of continuous strands bent along diagonal lines, with each fold partially overlapping the preceding fold. In this arrangement, however, the portions 61 of the strands are more nearly at right angles to the longitudinal line of the mesh than are the portions 62 of such strands. This structure is designed to change the directions of maximum fabric strength and flexibility, and to make the values thereof different as required; also to make different designs for decorative and useful effect. The strands at 61 may be 90° to the longitudinal or even greater, bringing them still closer to parallel with portions 62, to provide great strength in one direction, or great flexibility in another direction.

The mesh in this structure instead of being square, square on edge or diamond is rhomboidal. The directions of maximum strength and maximum flexibility are therefore not at an equal angle with the longitudinal and are not of equal value but may be changed to suit requirements.

It will be noted that the major direction of maximum strength of this fabric will be along the lines 62 and that the minor direction of maximum strength will be along lines 61.

Figs. 12 and 13 show a form of fabric having a set of continuous strand wires 64 bent along diagonal lines, somewhat as in Fig. 1, with each fold partially overlapping the preceding fold and welded thereto. In order to produce greater strength or closer mesh at the mid portion of the fabric, I incorporate intermediate continuous bent strands 65 and 65a, between the strands 64, which extend only partially across the width of the fabric, and are welded at their points of crossing each other and strands 64 as shown respectively at 66 and 66b.

Fig. 14 shows a modification of the structure of Fig. 12, in that it is composed of a series of continuous bent strands 67 disposed along diagonal lines and welded together, and a series of bent continuous strands 68 adjacent to each edge of the fabric and overlying the strands 67. The strands 68 are welded at their crossings and also where they cross the strand 67, as indicated at 69. This arrangement gives a closer mesh and greater strength near the edges of the fabric and creates a different ornamental appearance than does the arrangement of Fig. 12.

Fig. 15 shows a fabric having mesh formed similar to that of Fig. 1, but wherein edges of the fabric present a continuous unbroken appearance when using a long bend, the continuous wires being bent along straight lines at their edges, as shown in Fig. 16; thus the wire 74 will be bent at 73 in a straight line, and for such distance that it will cross the adjacent wire 75, the wire 74 continuing across the mesh in a reverse direction, and being similarly bent at the opposite edge of the mesh as indicated at 76. The wire 75, as well as the other wires, are similarly bent at the edges of the mesh. Two more strands must be fed in the series when bend 73 takes up one strand spacing instead of being a single angular bend.

If the bend should take two or more strand spacings the number of strands should be increased by four or more strands. The number of strands in the series may therefore be varied by changing the length of bend. With the long bend the part of a preceding layer covered will also vary. For strong edges, this bend may cover several wire spacings giving multiple overlapping bends.

In Fig. 17, I show a mesh formed of a series of wires bent mainly along diagonal lines, but which are backwardly bent at the edges of the fabric. Thus, the wire 77 is laid along one diagonal line and bent backwardly at 78, thereupon being laid along a diagonal line, and again bent at 79, at the opposite edge of the fabric. The other strands are similarly bent, and it will be seen that each strand crosses not only itself but the other strands.

When this edge bend is used, the fabric is composed of two less strands than for single angular bends. If the reverse bend should take two or more strand spacings the number of strands should be diminished by four or more strands, and the part of a preceding layer covered will again change.

Fig. 19 shows a mesh formed of continuous strands which strands are bent not only at the edges of the fabric, but also at an intermediate point within the width of the fabric. Thus a strand 81 is bent at 82, then at point 83, at point 84 and again at 85. The other wires are similarly bent and the various wires welded together at suitable points.

This method of bending and laying of strands is advantageous in varying the structures, width of fabric, number of strands handled and fed in the series, and the longitudinal space required in making fabric.

Fig. 20 shows a modification of the structure of Fig. 19 in that the wires are bent at points intermediate the edges of the fabric. In this case, however, each wire is bent at two intermediate points 86 and 87, the portions of the wire intermediate said points lying in lines which are at right angles to the longitudinal center line of the fabric.

The fabric formed in this single operation is composed of three bands of different patterns. The upper diagonal strands forming square mesh on edge and the lower diagonal strands forming diamond mesh with transverse strands or rectangular mesh at the center band. The fabric width with a given spacing, mesh pattern and number of strands can be varied in this manner.

Fig. 21 shows a fabric consisting of three continuous strands 88, 89 and 90, which are laid in overlapping relation, but which are offset in directions longitudinally of the fabric to produce the desired mesh structure and spacing and symmetrical overlapping edge bends which may also be used in Fig. 10. The strands are suitably welded or otherwise secured together at the points where they cross one another and longitudinal straight or bent strands may also be applied.

In Fig. 22, I show a structure composed of a series of continuous wires 91, 92, 93, 94, 95 and 96 that are bent to stepped form, as shown more clearly in Fig. 23, with the corners of the stepped portions of each wire having contact with and secured to the adjacent stepped portions of the other wires in the series to thereby form mesh openings of rectangular shape. In this structure the paths in which the strands of the series are laid between opposite edges of the fabric intersect.

I claim as my invention:—

1. A mesh fabric comprising a series of continuous strands, portions of said strands extending along parallel diagonal lines, and other portions thereof extending along other parallel diagonal lines and overlapping the first-named portions, the strands being secured together at their points of contact, and one of said portions being of greater angularity relative to the longitudinal center line of the fabric than the other.

2. A mesh fabric comprising continuous wires laid in overlapping relation along two sets of diagonal lines, which cross one another, the one set of lines being of greater angularity than the other, relative to the longitudinal direction of the fabric, and the wires being connected together in unitary relation.

3. A mesh fabric consisting of a series of continuous strands so bent along lines parallel to the fabric that portions of said strands extend along parallel diagonal lines and other portions along other diagonal lines and overlap part of the first-named portions, the strands being secured together, one of said portions being at greater angularity to the longitudinal center line of the fabric than the other.

4. As a new article of manufacture, zigzag, unwoven, diamond-mesh sheet fabric consisting of a set of continuous laterally spaced strands recurrently laid or folded inwardly from the sheet edges, with each succeeding lay or fold on the same face of, and overlapping substantially half the area of, the preceding lay or fold, and made self-sustaining by the strands having the meeting surfaces thereof directly secured together at points of crossing.

5. Fabric in accordance with claim 4, and in which the width of the set of strands is at least as great as the sheet width.

6. Fabric in accordance with claim 4, and in which the width of the set of strands is substantially twice the sheet width, and the mesh is substantially square.

7. Fabric in accordance with claim 4, and in which the bends of the strands between the lays or folds are in substantially straight lines at the edges of the sheet.

8. Fabric in accordance with claim 4, and in which the sheet width is substantially half the width of the set of strands and the mesh is substantially square and the bends in the strands between the lays or folds are in substantially straight lines at the edges of the sheet.

9. As a new article of manufacture, zigzag, unwoven, diamond-mesh sheet fabric, consisting of a set of continuous laterally spaced metallic strands recurrently laid or folded inwardly from the sheet edges, with each succeeding lay or fold on the same face of, and overlapping substantially half the area of the preceding lay or fold, and made self-sustaining by the metallic strands being welded together at points of crossing.

10. Fabric in accordance with claim 9, and in which the width of the set of strands is at least as great as the sheet width.

11. Fabric in accordance with claim 9, and in which the width of the set of strands is substantially twice the sheet width, and the mesh is substantially square.

12. Fabric in accordance with claim 9, and in which the bends of the strands between the lays or folds are in substantially straight lines at the edges of the sheet.

13. Fabric in accordance with claim 9, and in which the sheet width is substantially half the width of the set of strands and the mesh is substantially square, and the bends in the strands between the lays or folds are in substantially straight lines at the edges of the sheet.

14. A fabric comprising a series of continuous strands similarly bent along lines parallel to the plane of the fabric and extending in diagonal paths across the width of the fabric, the strands being laterally displaced relatively to each other so that some of such strands overlap others and extend from one face to the other face at points intermediate opposite edges of the fabric and having the strand crossing directly secured together.

15. A fabric comprising a series of laterally spaced continuous strands laid along a repeated path from one edge crosswise of the fabric and returning to the same edge at an advanced position along its length, the path followed being such that some strands partly overlap and are partly overlapped by others so as to extend from face to face of the fabric at points between the opposite edges thereof and having the crossings of strands directly secured together.

16. A fabric comprising a series of continuous laterally spaced strands recurrently laid inwardly from the edges thereof and partly overlapping a preceding lay, portions of the strands between opposite edges following similar paths and other portions thereof lying in paths which have different angular relationship to the longitudinal lines of the fabric than the first named paths, and the strands being secured together.

17. A fabric comprising a series of continuous laterally spaced strands laid in the plane of the fabric along a repeated path that touches both edges, each cycle advancing the strands along the length of the fabric, some of the strands partly overlapping others and extending from one face to the other face of the fabric between the edges thereof, the crossings of strands being directly secured together.

18. A fabric comprising a series of continuous, laterally spaced strands, each strand being laid forwardly and backwardly diagonally across the fabric, part of the strands periodically crossing other strands, certain of the strands alternately passing under and then over other strands which they meet, to form a diagonal strand fabric wherein certain strands extend from one face to the other at points intermediate the edges of the fabric, and having the crossings directly secured together.

19. A fabric comprising a series of continuous strands each strand laid forwardly and backwardly diagonally across the fabric, the different strands being relatively displaced longitudinally thereof, certain of the back-returning diagonal portions of the strands passing alternately above and then below the forward-pointing diagonal strand portions which they pass, to form a diagonal strand fabric and having the crossings directly secured together.

20. A fabric comprising a series of continuous strands bent in directions parallel to the plane of the fabric, back and forth in the plane of the fabric, and laid in such angular paths that each strand crosses and recrosses itself, progressively, the strands being secured together in unitary relation.

21. A fabric comprising a series of continuous strands bent in directions parallel to the plane of the fabric, back and forth in the plane of the fabric, and laid in such angular paths that each strand crosses and recrosses itself and other strands, progressively, the strands being secured together in unitary relation.

22. A fabric composed of a series of continuous laterally-spaced strands laid forwardly and backwardly along diagonally cross lines, alternate strands of the series being connected together at their points of crossing and the remaining strands of the series being connected together at their points of crossing, to form two interconnected groups of strands that are shiftable for a limited distance relative to each other.

23. A fabric composed of a series of continuous laterally-spaced strands recurrently laid or folded inwardly from the sheet edges, with each succeeding lay or fold on the same face of, and overlapping a portion of the preceding lay or fold, alternate strands of the series being secured together at their points of intersection, and the remaining strands being connected together at their points of crossing, to form two interconnected groups of strands that are shiftable for a limited distance relative to each other.

WILLIAM EDGAR REED.